US009746867B2

(12) United States Patent
Hess et al.

(10) Patent No.: US 9,746,867 B2
(45) Date of Patent: Aug. 29, 2017

(54) WETTING CURRENT SEQUENCING FOR LOW CURRENT INTERFACE

(71) Applicant: Hamilton Sundstrand Corporation, Charlotte, NC (US)

(72) Inventors: Gary L. Hess, Enfield, CT (US); Kirk A. Lillestolen, East Hartland, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 329 days.

(21) Appl. No.: 14/690,646

(22) Filed: Apr. 20, 2015

(65) Prior Publication Data

US 2016/0306375 A1 Oct. 20, 2016

(51) Int. Cl.

| | |
|---|---|
| ***H01H 47/00*** | (2006.01) |
| ***H01H 83/00*** | (2006.01) |
| ***H02J 7/00*** | (2006.01) |
| ***G05F 3/02*** | (2006.01) |
| ***H01H 1/60*** | (2006.01) |
| ***H01R 43/00*** | (2006.01) |

(52) U.S. Cl.

CPC ............... *G05F 3/02* (2013.01); *H01H 1/605* (2013.01); *H01R 43/002* (2013.01)

(58) Field of Classification Search

CPC . H02H 11/00; H02J 9/06; H02J 9/061; H03K 17/0822; H05B 39/08

USPC .......................................................... 307/125

See application file for complete search history.

(56) References Cited

U.S. PATENT DOCUMENTS

| | | | | |
|---|---|---|---|---|
| 3,281,829 A | 10/1966 | Baumgartner | | |
| 4,477,774 A | 10/1984 | Revirieux | | |
| 5,621,250 A | 4/1997 | Kim | | |
| 6,800,965 B1 | 10/2004 | Turner et al. | | |
| 8,798,844 B2 | 8/2014 | Browne et al. | | |
| 2010/0283512 A1* | 11/2010 | Acharya | H02J 13/002 | 327/101 |
| 2012/0139553 A1* | 6/2012 | Nortman | H02J 7/0016 | 324/537 |
| 2014/0139015 A1 | 5/2014 | Poisson | | |
| 2014/0312871 A1* | 10/2014 | Alley | G01R 19/00 | 323/299 |
| 2014/0320195 A1* | 10/2014 | Desai | H01H 47/002 | 327/382 |
| 2016/0061898 A1* | 3/2016 | Edwards | G01R 31/3277 | 324/762.09 |

FOREIGN PATENT DOCUMENTS

DE 4318188 12/1994

OTHER PUBLICATIONS

European Search Report for Application No. 16165814.1 dated Sep. 8, 2016.

* cited by examiner

*Primary Examiner* — Quan Tra

(74) *Attorney, Agent, or Firm* — Carlson, Gaskey & Olds, P.C.

(57) ABSTRACT

A process for automated contact wetting in a sensor circuit includes generating a first current through a contact by sequencing a first circuit on, the first current exceeding a wetting threshold of the contact, and reducing current through the contact to a second current by sequencing a second circuit on, the second current being below the wetting threshold.

14 Claims, 3 Drawing Sheets

WETTING CURRENT SEQUENCING FOR LOW CURRENT INTERFACE

TECHNICAL FIELD

The present disclosure relates generally to connections between sensor modules and controller inputs, and more specifically to an initialization sequencing for providing a wetting current in the same.

BACKGROUND

Electrical systems, such as those found within aircraft sensor systems, include contacts connecting circuit elements of one system or module to circuit elements of another system or module. The contacts provide a physical contact point between one or more connections in each of the systems or modules. The contact point allows electrical signals to be transferred from one system or module to the other system or module. When the electrical systems are unpowered for an extended period of time, oxidation can develop on the contact points.

Many aircraft sensor systems are high accuracy systems requiring a low operational current in the micro amp range ($10^{-6}$ amps) or the nano amp range ($10^{-9}$ amps). Errors introduced due to potential contact resistance arising from oxidation at a contact between the sensor and a corresponding controller input can significantly alter the output of a sensed value, rendering the sensor circuit unreliable.

SUMMARY OF THE INVENTION

Disclosed is a method for automated contact wetting in a sensor circuit including: generating a first current through a contact by sequencing a first circuit on, the first current exceeding a wetting threshold of the contact, and reducing current through the contact to a second current by sequencing a second circuit on, the second current being below the wetting threshold.

Also disclosed is a sensor configuration including: a first sensor circuit connected to a contact, a controller input circuit connected to the contact, such that a sensor output is operable to be passed through the contact to the controller input, a sequencing controller controllably coupled to each of the first sensor circuit and the controller input circuit such that the sequencing controller is configured to control energizing each of the first sensor circuit and the controller input circuit, and the sequencing controller including instructions operable to cause the sensor configuration to generate a first current through a contact by sequencing a first circuit on, the first current exceeding a wetting threshold of the contact, and reduce current through the contact to a second current by sequencing a second circuit on, the second current being below the wetting threshold.

These and other features of the present invention can be best understood from the following specification and drawings, the following of which is a brief description.

DETAILED DESCRIPTION OF AN EMBODIMENT

One method of reducing the effect of contact oxidation is to pass a current through the contact and burn the oxidation off the contact. This process is referred to as wetting the contact, and requires a current of sufficient magnitude to burn away the oxidation. Once an oxidation free contact has been created, continued contact between circuit elements can be maintained with a significantly lower operating current. In highly accurate sensor connections, the wetting current is sufficiently high that sensor signals in the micro or nano scale are overwhelmed by the wetting current, and a controller input is unable to properly interpret the sensed information if the wetting current is continuously provided.

Figure 1:
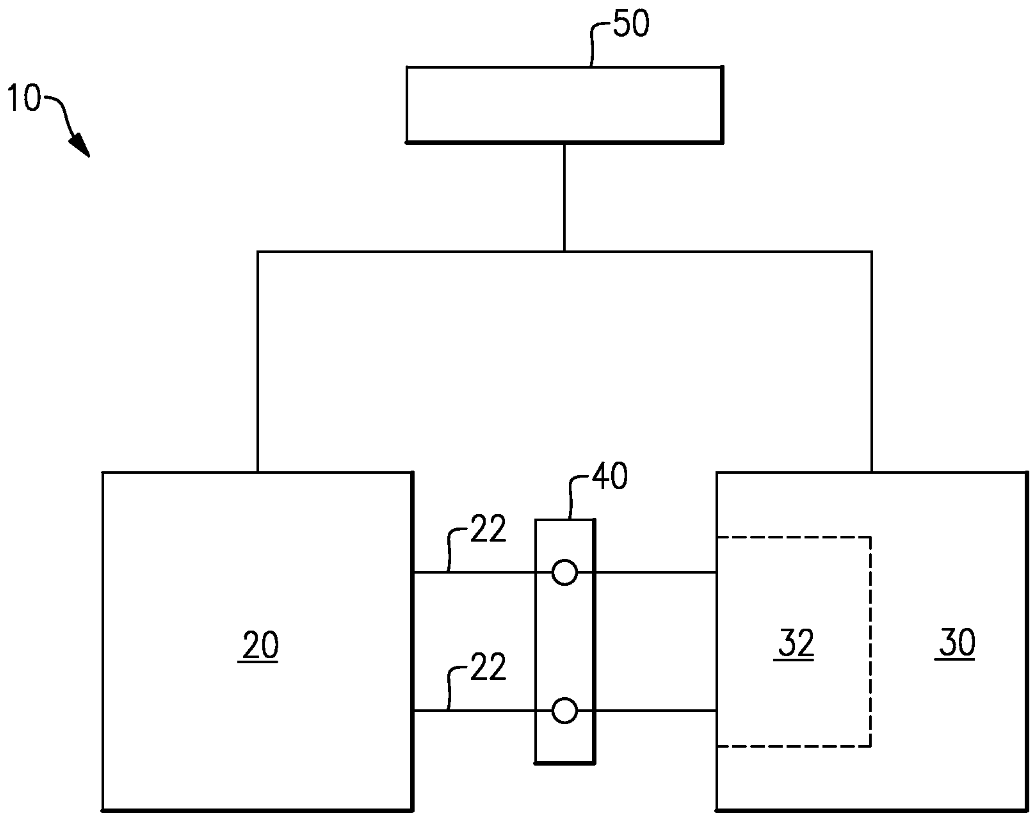
FIG. 1 schematically illustrates an exemplary sensor and controller arrangement including a contact susceptible to oxidation.

FIG. 1 schematically illustrates an exemplary sensor and controller arrangement 10 including a contact 40 susceptible to oxidation. The sensor and controller arrangement 10 includes a high accuracy sensor 20 providing outputs 22 in the nano amp or micro amp scale. The sensor 20 is connected to a controller 30 via the contact 40. The contact 40 can be a relay, a switch, a connector module, or any other contactor type that is susceptible to oxidation.

The controller 30 includes a controller input circuit 32 that is also connected to the contact 40. The controller input circuit 32 receives an input current from the contact 40 and pre-processes the input current into a form interpretable by the remainder of the controller 30. In some examples, such as the example illustrated in FIG. 2 and described below, the pre-processing can take the form of amplification raising the current from a nano or micro scale to a scale compatible with the remainder of the controller 30.

The operations and powering on of each of the sensor 20 and the controller 30 are controlled by a second controller 50. In some examples the second controller 50 is another module within the controller 30 or another control element in the controller 30. In alternate examples, such as the illustrated example of FIG. 1, the second controller 50 is an independent controller within the sensor and controller arrangement 10. In such an example, the second controller 50 can perform additional control functions within an electrical system unrelated to the control of the sensor and controller arrangement 10 simultaneously or approximately simultaneously with the control of the sensor and controller arrangement 10.

In some examples, it can be desirable to generate the wetting current without including a specific wetting current circuit in the sensor and controller arrangement 10. In order to do so, the second controller 50 sequences the initialization of the sensor 20 and the controller 30 such that an initial high current is generated, followed by a lower operational current. The initial high current exceeds a current level required to wet the contacts in the contact 40. The current required to wet the contacts is referred to as a wetting threshold, and can be determined by one of skill in the art based on the type of contact 40, and the conditions to which the contact 40 will be exposed.

Figure 2:
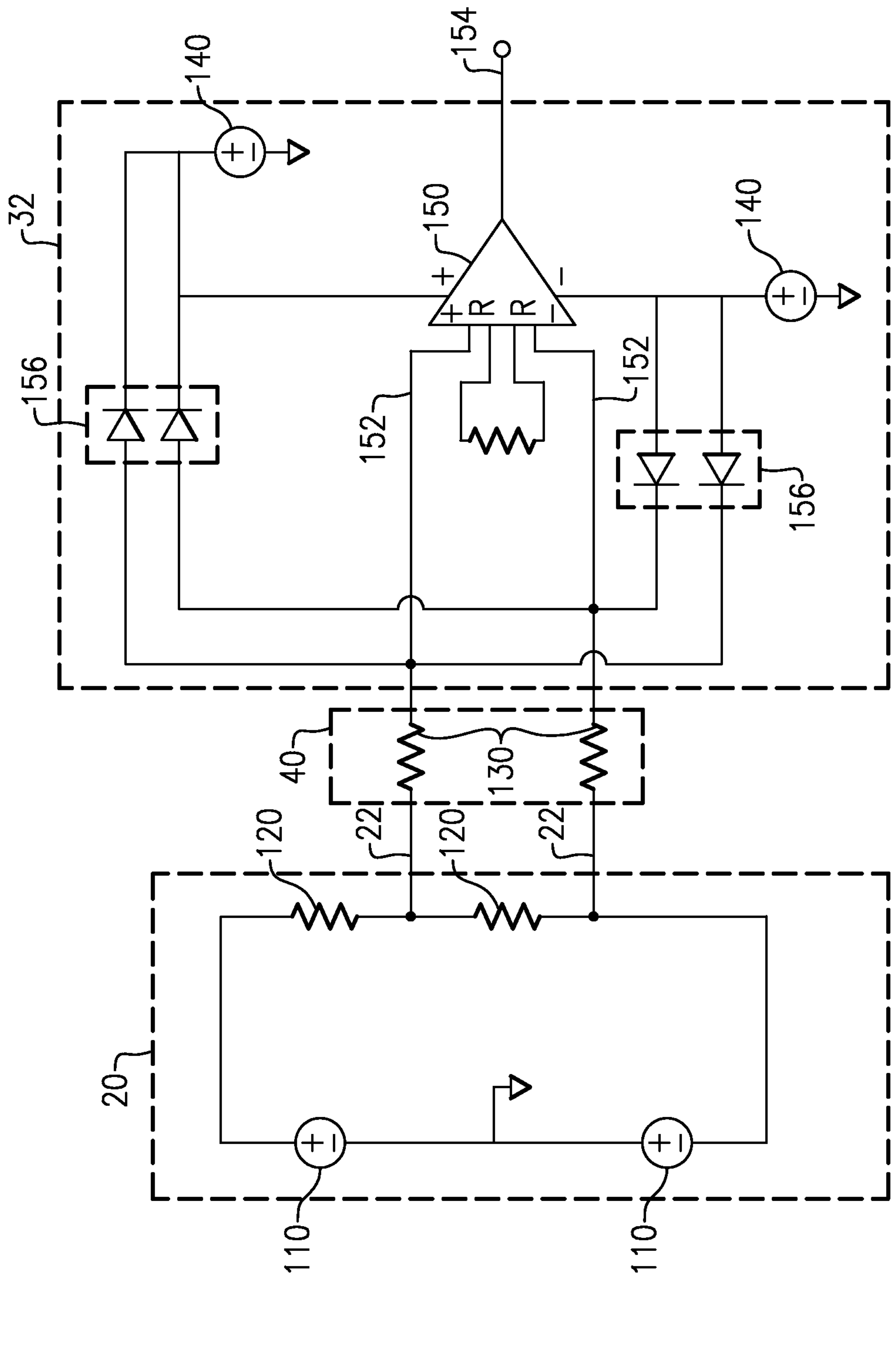
FIG. 2 provides a more detailed schematic view of one example sensor and controller input for utilization in the arrangement of FIG. 1.

With continued reference to FIG. 1, and with like numerals indicating like elements, FIG. 2 schematically illustrates a more detailed view of one example sensor 20 and controller input circuit 32 for utilization in the arrangement of FIG. 1. The sensor 20 includes multiple power sources 110 capable of driving the sensor 20, as well as multiple sensing elements 120. In the illustrated example, the sensing elements 120 are sense resistors. However, one of skill in the art having the benefit of this disclosure will appreciate that alternate forms of sensing elements could be utilized within the sensor 20 in place of, or in addition to, the illustrated sense sensing elements 120.

The sensor 20 includes outputs 22 that are provided to the contact 40. The contact 40 includes some element of contact resistance in part due to standard contact mechanics, and in part due to oxidation at the contact points. The contact resistance is represented in the illustration as resistors 130. One of skill in the art, having the benefit of this disclosure, will understand that the illustrated resistors 130 can represent multiple sources of contact resistance.

Also connected to the contact 40 is the input circuit 32 of the controller 30. The illustrated input circuit 32 includes multiple power sources 140, each of which is connected to, and drives an amplifier 150. The amplifier 150 includes inputs 152 connected to the contact, and amplifies the sensor signals passed through the contact 40 to a level readable by the controller 30. The amplifier 150 outputs the amplified sensor signal to the remainder of the controller 30 at an output 154.

Each of the power sources 140 is connected to the each of input lines 152 via protection current diodes 156. The protection current diodes 156 are oriented such that when the sensor 20 is switched on while the input circuit 32 is switched off, a current is caused to flow through the contact 40. One of skill in the art, having the benefit of this disclosure, will be able to select voltage and current values for the power sources 110, 140 such that the current provided in this state exceeds the wetting current threshold of the contact 40 without exceeding rated current values of either the sensor module 20 or the circuit input 32.

Once the input circuit 32 has been switched on, the current passing through the contact 40 is reduced to a sensor operations level. If the sensor 20 operates in a nano amp range, the total current passing through the contact 40 is reduced to the nano amp range. Similarly, if the sensor 20 operates in a micro amp range, the total current passing through the contact 40 is reduced to the micro amp range. While continued current is passed through the contact 40, even if the contact is below the wetting threshold, oxidation is prevented, and a solid connection can be maintained.

Figure 3:
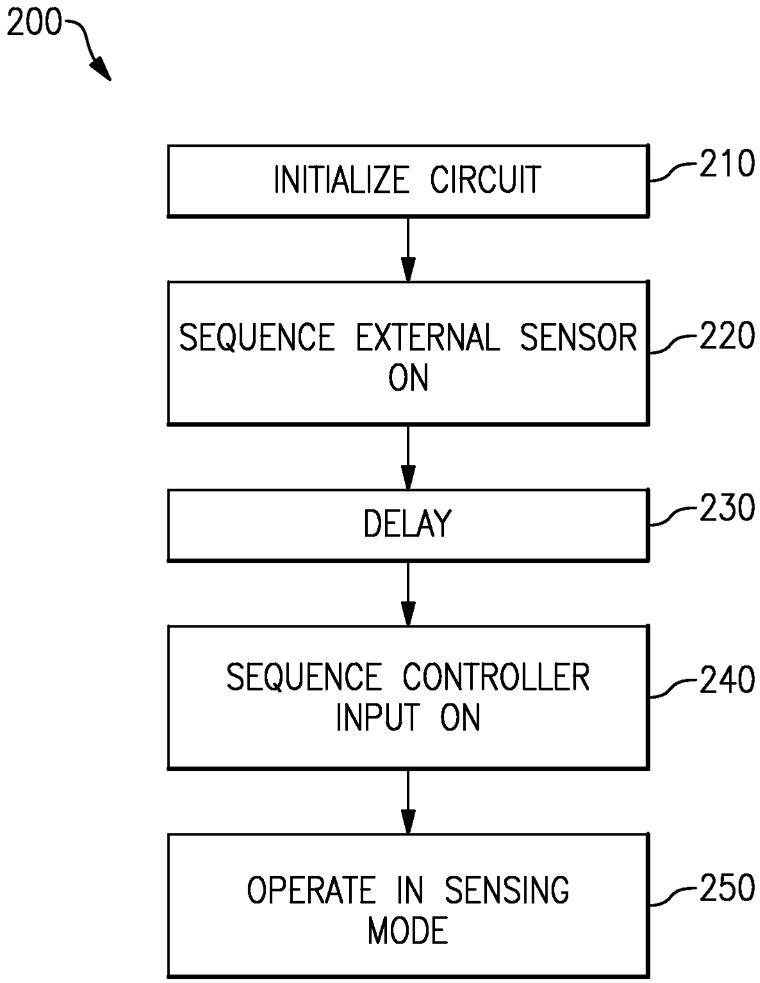
FIG. 3 illustrates a flowchart showing an exemplary sequencing method for generating a wetting current in a low current sensor and controller arrangement.

With continued reference to FIGS. 1-2, and with like numerals indicating like elements, FIG. 3 illustrates a flowchart showing an exemplary sequencing method 200 for generating a wetting current in a sensor and controller arrangement, such as the sensor and controller arrangement 10 of FIG. 1. Initially the second controller 50 begins initializing the circuit at an "Initialize circuit" block 210. The initialization process begins energizing the sensor 20 and the controller 30, and is performed prior to the controller 30 needing to gather information from the sensor.

Next, the external sensor 20 is sequenced on in a "Sequence External Sensor On" block 220. Sequencing the external sensor 20 on entails energizing the power sources 110 in the external sensor 20. Energizing the power sources 110 within the sensor 20 prior to energizing the power sources 140 in the input circuit 32 of the controller 30 causes a current in excess of a wetting current to be driven through the contact 40.

Once the external sensor 20 has been sequenced on, further initialization is delayed at a "Delay" block 230. The delay is a predetermined delay period of sufficient length to allow oxidation at the contact 40 to be burned off, and a solid connection between the sensor 20 and the input circuit 32 to be established. In some examples, the delay can be approximately 1 millisecond.

After the delay has elapsed, the second controller then sequences the input circuit 32 of the controller 30 on at a "Sequence Controller Input On" block 240. Sequencing the input circuit 32 on includes energizing the power sources 140 in the input circuit 32. The energy from the power sources 140 causes the current flowing across the contact 40 to be below the wetting threshold, and within a predetermined operating range of the sensor 20 and the circuit input 32 is placed in a sensing mode. As continued passing of current across the contact 40, even below the wetting threshold, is sufficient to prevent further oxidation of the contact 40, operation of the sensor 20 in the sensing mode is sufficient to maintain the connection in a "Operate in Sensing Mode" block 250.

With continued reference generally to FIGS. 1-3, and with specific reference again to FIG. 2, the following is an exemplary operation of the specific example sensor and controller arrangement 10 of FIG. 2. The power sources 110 of the sensor 20 are +/−15V sources and arranged in conjunction with a resistor divider that generates 5V. The amplifier 150 is configured as an instrumentation amplifier and applies a gain of two (2) to the received input signals.

When the second controller 50 begins sequencing on the sensor 20 and the input circuit 32, excitations to the external sensor 20 are applied, but the instrumentation amplifier 150 is not powered on. As a result of this configuration, a current significantly in excess of a normal operating current of the sensor 20 is caused to flow through the contact resistances 130 and through the protection diodes 156. The current provides power to power supply rails of the amplifier 150 which is still at a ground potential. This current is in excess of the wetting threshold, and burns off connector oxidation generating a clean contact between the sensor 20 and the input circuit 32.

Approximately 0.5 milliseconds after the initialization of the power sources 110 in the sensor 20, the power sources 140 in the input circuit 32 are energized, providing power directly to the amplifier 150. The power sources 140 back bias the protection diodes 156. The back biasing places the input circuit 32 in an operational mode with minimal current flowing through the contact 40. Since the oxidation is burned off during the initial high current state, normal low current operation can be maintained as long as the sensor 20 and the input circuit 32 remain energized.

One of skill in the art, having the benefit of the above disclosure, will understand that the specific operational parameters of the example of FIG. 2 are purely exemplary in nature and can be modified or adjusted as needed to suit a specific application. Such modifications or adjustments are within the ordinary skill in the art.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for automated contact wetting in a sensor circuit comprising:

generating a first current through a contact by sequencing a first circuit on, the first current exceeding a wetting threshold of the contact; and reducing current through the contact to a second current by sequencing a second circuit on, the second current being below the wetting threshold.

2. The method of claim 1, further comprising delaying reducing current through the contact to a second current by sequencing a second circuit on, the second current being below the wetting threshold until the first current has passed through the contact for a preset delay period.

3. The method of claim 1, wherein sequencing a first circuit on comprises exciting a sensor circuit connected to the contact.

4. The method of claim 1, wherein sequencing a second circuit on comprises exciting a controller input circuit connected to the contact.

5. The method of claim 1, further comprising operating in a sensing mode after reducing the current through the contact to a second current by sequencing a second circuit on, the sensing mode comprising passing a current below a sensing threshold through the contact.

6. The method of claim 5, wherein the sensing threshold is at least one order of magnitude lower than the wetting threshold.

7. The method of claim 1, wherein sequencing of the first circuit and sequencing of the second circuit is controlled by a wetting controller.

8. The method of claim 1, further comprising maintaining the second current for at least a duration of first circuit operations.

9. A sensor configuration comprising:

a first sensor circuit connected to a contact;

a controller input circuit connected to the contact, such that a sensor output is operable to be passed through the contact to the controller input;

a sequencing controller controllably coupled to each of said first sensor circuit and said controller input circuit such that said sequencing controller is configured to control energizing each of said first sensor circuit and said controller input circuit; and the sequencing controller including instructions operable to cause the sensor configuration to generate a first current through a contact by sequencing a first circuit on, the first current exceeding a wetting threshold of the contact, and reduce current through the contact to a second current by sequencing a second circuit on, the second current being below the wetting threshold.

10. The sensor configuration of claim 9, wherein said sequencing controller is a module within a controller including the controller input circuit.

11. The sensor configuration of claim 9, wherein said first sensor circuit comprises at least a sensor element, and a voltage source configured to drive said sensor element at a sensing current while said controller input circuit is energized, and configured to drive a wetting current through said contact when said controller input circuit is not energized.

12. The sensor configuration of claim 9, wherein the controller input circuit comprises an amplifier having inputs connected to the contact, at least one power source connecting a neutral to a corresponding one of said inputs via a protection diode.

13. The sensor configuration of claim 12, wherein said at least one power source connecting a neutral to a corresponding one of said inputs via a protection diode comprises a first power source connecting the neutral to a first amplifier input via a first protection diode and a second power source connecting the neutral to a second amplifier input via a second protection diode.

14. The sensor configuration of claim 9, wherein said controller input circuit is configured such that said controller input circuit is operable to reduce a current passing through said contact to a sensing current level when said controller input circuit is energized.

* * * * *